(12) United States Patent
Robertson et al.

(10) Patent No.: US 6,257,488 B1
(45) Date of Patent: *Jul. 10, 2001

(54) MAGNETIC DETECTOR FOR SECURITY DOCUMENT

(75) Inventors: Paul Robertson; John Fisher, both of Herts; Jon Burrell, Bourn, all of (GB)

(73) Assignee: N.V. Bekaert S.A., Zwevegem (BE)

( * ) Notice: Subject to any disclaimer, the term of this patent is extended or adjusted under 35 U.S.C. 154(b) by 0 days.

This patent is subject to a terminal disclaimer.

(21) Appl. No.: 09/308,819

(22) PCT Filed: Dec. 8, 1997

(86) PCT No.: PCT/EP97/06970

§ 371 Date: Jul. 2, 1999

§ 102(e) Date: Jul. 2, 1999

(87) PCT Pub. No.: WO98/26378

PCT Pub. Date: Jun. 18, 1998

(30) Foreign Application Priority Data

Dec. 12, 1996 (EP) ................................. 96203529
Jul. 26, 1997 (GB) ................................. 9715727

(51) Int. Cl.$^7$ ............................................... G06K 7/08
(52) U.S. Cl. ............................ 235/449; 235/439; 235/493; 235/450
(58) Field of Search .................... 235/449, 450, 235/435, 493, 439

(56) References Cited

U.S. PATENT DOCUMENTS

| | | | |
|---|---|---|---|
| 3,665,449 | * 5/1972 | Elder et al. | 340/572.1 |
| 3,700,862 | * 10/1972 | Snook et al. | 235/61.12 M |
| 3,873,975 | * 3/1975 | Miklos et al. | 360/25 |
| 4,114,032 | 9/1978 | Brosow et al. | 235/493 |
| 4,678,992 | * 7/1987 | Hametta | 324/208 |
| 4,686,515 | * 8/1987 | Anderson et al. | 340/572 |
| 4,820,912 | * 4/1989 | Samyn | 235/449 |
| 5,166,501 | * 11/1992 | Woolley | 235/488 |
| 5,451,759 | * 9/1995 | Hoshino et al. | 235/449 |
| 5,545,882 | * 8/1996 | Tanaka | 235/98 R |
| 5,545,885 | * 8/1996 | Jagielinski | 235/449 |
| 5,602,381 | * 2/1997 | Hoshino et al. | 235/493 |

(List continued on next page.)

FOREIGN PATENT DOCUMENTS

| | | |
|---|---|---|
| 26 35 795 | 8/1976 | (DE) . |
| 0295085 | * 12/1988 | (EP) . |
| 0 625 766 | 5/1994 | (EP) . |
| 0 632 398 | 6/1994 | (EP) . |
| 0 656 607 | 12/1994 | (EP) . |
| WO 95/24000 | 9/1995 | (WO) . |

Primary Examiner—Michael G. Lee
Assistant Examiner—Jamara A. Franklin
(74) Attorney, Agent, or Firm—Shlesinger, Arkwright & Garvey LLP (57) ABSTRACT

Apparatus for detecting the presence of magnetic elongated particles in a substrate, the base material of the substrate having magnetic properties substantially differing from the corresponding magnetic properties of the elongated particles. The elongated particles have such a long and thin form that their demagnetization factor N is smaller than $\frac{1}{250}$, they have a diameter smaller than 30 micrometer, and they have a magnetic saturation field greater than 100 A/m. Apparatus includes an emitter which emits an electromagnetic source signal of one or more particular base frequencies to the substrate (e.g., so that any magnetic elongated particles present go into a non-linear part of a B-H curve for at least part of cycle of the source signal). Apparatus also includes a detector that detects an electromagnetic detection signal emanating from the substrate for examining the detection signal for the presence of particular higher harmonics of the base frequencies or of any linear combination of the base frequencies or of the harmonics, particular higher harmonics being indicative of the presence of the magnetic elongated particles.

27 Claims, 3 Drawing Sheets

U.S. PATENT DOCUMENTS

| | | | | |
|---|---|---|---|---|
| 5,614,824 | * | 3/1997 | Dames et al. | 324/239 |
| 5,672,859 | * | 9/1997 | Samyn et al. | 235/468 |
| 5,698,839 | * | 12/1997 | Jagielinski et al. | 235/493 |
| 5,988,500 | * | 11/1999 | Litman | 235/450 |
| 5,992,741 | * | 11/1999 | Robertson et al. | 235/449 |
| 6,019,208 | * | 2/2000 | Vladymir | 194/206 |
| 6,053,406 | * | 4/2000 | Litman | 235/449 |
| 6,202,929 | * | 3/2001 | Verschuur et al. | 235/462.25 |

\* cited by examiner

MAGNETIC DETECTOR FOR SECURITY DOCUMENT

CROSS REFERENCE TO RELATED APPLICATIONS

This application is the U.S. National Stage Application of International Application No. PCT/EP97/06970, filed Dec. 8, 1997, which claims the priority of European Application No. 96203529.1, filed Dec. 12, 1996.

This application relates to application Ser. No. 08/987, 047, filed Dec. 10, 1997, now U.S. Pat. No. 5,992,741 to Robertson et al., issued Nov. 30, 1999, which claims the priority of European Patent Application No. 96203529, filed Dec. 12, 1996 and European Patent Application No. 96402721, filed Dec. 12, 1996.

FIELD OF THE INVENTION

The present invention relates to an apparatus for detecting the presence of particles in a substrate the base material of which has electromagnetic properties substantially differing from the corresponding electromagnetic properties of the particles.

The invention is intended primarily to be used in the identification or authentication of all type of security documents having a paper or synthetic base material such as bank notes, cheques, passports, credit-cards, tickets, lottery-tickets and bonds which comprise the above particles, but it is also applicable to other applications in which objects need to be recognised.

BACKGROUND OF THE INVENTION

The prior art has already dealt in an extensive way with the identification of security documents.

Some prior art solutions go in the direction of recognition of possible characteristic patterns printed at the surface of some security documents.

In order to prevent genuine security documents from being falsely copied by means of high-resolution colour photocopying apparatus, the prior art has also proposed to add to the fibrous structure of the base material of the substrate or to the surface of the document one or more security elements allowing the identification and/or making difficult the manufacturing of the document.

U.S. Pat. No. 4,114,032 (priority date 1973) and U.S. Pat. No. 4,218,674 (filing date 1975) disclose a similar system where the security documents have fibers which are coated with a magnetic or magnetizable material embedded therein. The mere presence of the magnetic fibers inside the security documents is tested or, as an improved feature, the distribution of the magnetic fibers in the security document is measured so that every single security document can be given a unique mark. Up to 500 million different possible combinations may be obtained. EP-A-0 625 766, EP-A-0 632 398 and EP-A-0 656 607 (all filing date in 1993) disclose a system where the fibers consist of magnetic powder as core of a polymer sheath. Magnetic detection is done by DC current used to excite a coil.

Because of magnetic prehistory or disturbing of magnetic fields or deformations of the security documents, however, the repetitivity of such a magnetic scanning system is not ensured and accurate discrimination between genuine security documents and counterfeit documents is not always guaranteed. So detection is not always distinctive.

Moreover, if characters on the security document have been printed by means of a magnetic ink which is detectable by means of a sorting apparatus, there may be interference between the magnetic fibers and the magnetic ink of the characters.

Other embodiments disclosed in the prior art are based on the detection of particular electromagnetic properties of the security elements. FR 2 425 937 discloses a method of dispersing metallic fibers, more particularly stainless steel fibers, inside the fibrous structure of paper in order to allow the identification by means of microwaves.

U.S. Pat. No. 4,820,912 (priority date 1985) discloses an alternative system where the security documents comprise randomly distributed electrically conductive fibers. By scanning the documents by means of microwaves the unique distribution of the fibers inside the security document can be obtained. Up to $64^{320}$ different possible combinations of the mark characterising this distribution can be obtained. Application of this microwave technique to reproduction apparatus such as photocopying apparatus in order to prevent security documents from being copied, such as disclosed in WO-A-95/24000 (priority date 1994) fails to distinguish security documents from printed circuit boards (PCB's) or from greeting cards having decorative metal foils on its surface. In addition, with a system mounted on existing designs of colour photocopier, it is not practicable to measure the microwave transmission through the platen area and document as this would require an area sensor mounted on the photocopier lid, and this is generally incompatible with their design. Measuring the microwave signal in reflection, it has been found that the signals from people's hands are indistinguishable from those from documents containing metal fibers. On the other hand, the system does not discover the presence of the fibers if a metal plate is put above a genuine security document. Particular cover lids of photocopying apparatus or metallic parts in the neighbourhood of the photocopying apparatus, may disturb the system. As a consequence, these systems are not completely reliable.

The prior art has also provided a number of optical authentication systems. Some of them have been disclosed already in U.S. Pat. No. 3,313,941 (filing date 1963) and in U.S. Pat. No. 3,449,585 (filing date 1966). All optical systems, however, suffer from the major drawback that wear or damage or dirt on the surface of genuine security documents can cause the security documents as being no longer recognised as authentic.

OBJECTS AND SUMMARY OF THE INVENTION

It is an object of the present invention to avoid the drawbacks of the prior art. It is another object of the present invention to provide for a robust recognition system that allows to distinguish genuine security documents from other objects or documents.

It is also an object of the present invention to provide for a system which prevents genuine security documents from being copied.

It is still another object of the present invention to provide for a system that does not interfere with conventional magnetic character readers.

It is a further object of the present invention to provide for a substrate such as a security document, more particularly a banknote, including security elements, easily detectable in an anti-photocopy system.

According to a first aspect of the present invention, there is provided a method for detecting the presence of magnetic elongated particles in a substrate the base material of which has magnetic properties substantially differing from the corresponding magnetic properties of the elongated particles. Preferably the base material is made of a non-magnetic material. The elongated particles have such a long and thin form that their demagnetisation factor N is smaller than $\frac{1}{250}$, preferably smaller than $\frac{1}{1000}$. Their cross-sectional diameter is smaller than 30 micrometer and their magnetic saturation field $H_s$, is greater than 100 A/m, preferably greater than 200 A/m and most preferably greater than 300 A/m. The magnetic saturation field $H_s$ is preferably smaller than 1000 A/m. The terms "magnetic saturation field $H_s$" are herein defined as the magnetic field at the onset of the saturation flux density $B_s$. The terms "cross-sectional diameter" herein refer to the maximum cross-sectional dimension.

The method comprises the following steps:
(a) emitting an electromagnetic source signal of one or more particular base frequencies to the substrate so that any present magnetic elongated particles go into a non-linear part of their B-H curve for at least part of a cycle of the source signal;
(b) detecting an electromagnetic detection signal emanating from the substrate;
(c) testing the detection signal for the presence of particular higher harmonics of the base frequencies or of any linear combination of the base frequencies as well as the harmonics, where the particular higher harmonics are indicative of the presence of the magnetic elongated particles.

Using the non-linearity of the magnetisation or magnetization properties of the labelling material, i.e. the change in magnetic flux density B with applied magnetic field H as an effective parameter for detection is a technique which is known as such in electronic article surveillance (EAS) or anti-theft systems. The signals which can be obtained from this approach are very distinctive and the electronics and signal processing can be straight forward. EAS systems have been disclosed in an extensive way in the patent literature. Some examples are FR 763 681 (filing date 1933), U.S. Pat. No. 3,631,442 (filing date 1967), U.S. Pat. No. 3,990,065 (filing date 1975) and EP-A-0 153 286 (priority date 1984).

A number of substantial differences between EAS systems and the present invention are, however, apparent, In EAS systems anti-theft labels are used to trigger alarms at the exit areas of shops if the products have not been offered at the pay-desk. The exit area of a shop is much larger than the volume required for detection of magnetic elongated particles in security documents. A typical exit gate has a width of about 1 m, while in the present invention distances of only a few cm, e.g. of only 0.5 to 5 cm, between the magnetic field and the magnetic elongated particles are sufficient to perform the detection. This basic difference leads to a number of properties which are different for application of the present invention:

1) The magnetic material of EAS labels is rather bulky, since it must be present in a sufficient volume to trigger off the alarm in the relatively large exit area a typical cross-sectional dimension is about 1 mm and the length can be several cm long. In contrast herewith, the magnetic elongated particles according to the present invention have a much smaller volume. Their demagnetisation factor N is smaller than $\frac{1}{250}$, preferably smaller than $\frac{1}{1000}$ and their cross-sectional diameter is smaller than 30 micrometer, preferably smaller than 15 micrometer and most preferably ranging from 1 to 10 micrometer. The maximum value for the demagnetisation factor N is chosen so that the magnetic elongated particles can be detected by means of an apparatus with acceptable coil dimensions and power dissipation so that they can be installed on e.g. a photocopier or a bank note counting machine.

2) The magnetic material of EAS labels can be classified as very soft magnetic material, i.e. material having a very small coercive force $H_c$ and a relatively high dynamic permeability $\mu_d$ (for definition see below), since small magnetic fields H covering the exit area of a shop must be able to saturate the EAS labels. In contrast herewith, the magnetic elongated particles according to the present invention, although still being classified as soft magnetic materials, have such a shape and/or composition and/or structure that they are effectively magnetically hard enough to stay below the saturation point of their B-H loop in the fields used in the shop systems so that they do not generate high enough signals to activate the shop alarms. In comparison with EAS labels, the magnetic elongated particles according to the present invention have preferably a lower magnetic dynamic permeability $\mu_d$ and therefore require a substantially higher magnetic field to reach saturation. The magnetic saturation field $H_s$ of magnetic elongated particles according to the present invention is greater than 100 A/m, preferably greater than 200 A/m and most preferably greater than 300 A/m. This lower value is chosen not to trigger off EAS alarms. Preferably the magnetic saturation field H, is smaller than 1000 A/m so that it can be achieved by means of a detector apparatus with acceptable coil dimensions and power dissipation that it can be built in a photocopier or a bank note counting machine or an automatic vending machine. The inventors have experienced so far that anything over 1000 A/m will be difficult to achieve with an air cored coil. It is possible, however, to obtain a magnetic saturation field greater than 1000 A/m when making use of a ferrite cored coil or when making use of ferromagnetic powders in the core. The magnetic saturation flux density is preferably greater than 0.1 Tesla and typically ranges from 0.1 Tesla to 1.0 Tesla, and the dynamic permeability $\mu_d$ ranges from 10 to 10000, e.g. from 100 to 10000. Within the context of the present invention, all these magnetic properties have been determined by use of an alternating current magnetometer at frequencies from 10 kHz to 100 kHz.

3) Due to the bulky material of EAS labels, the frequencies applied are limited in order to reduce eddy current losses. In contradistinction herewith, much higher frequencies (higher than 1 kHz) can be applied in the present invention, since the magnetic elongated particles have a much lesser cross section area. The corresponding harmonics also have a much higher frequency (higher than 10 kHz) and typical harmonics have an order of ten or more times the fundamental drive frequency.

4) In EAS systems the problem of covering the large volume of the exit area of a shop and the problem of orientation-sensitive EAS labels has led to a number of embodiments where two or more base frequencies are used or to the use of an additional rotating magnetic field in order to create a global spatial magnetic field which is insensitive to the orientation of the EAS. Due to the much more limited sizes of the volumes required for the present detection method, such complications are not necessary for the present invention. A source signal of a single base frequency has proved to be sufficient.

In an embodiment of the present invention, the method comprises the additional step of: (d) generating a signal which prevents from taking a true copy in case said particular harmonics are present.

According to a second aspect of the present invention, there is provided a detection apparatus for detecting the presence of magnetic elongated particles in a substrate the base material of which has magnetic properties substantially differing from the corresponding magnetic properties of the elongated particles. Preferably the base material is made of a non-magnetic material. The elongated particles have such a long and thin form that their demagnetisation factor N is smaller than $1/250$. Their cross-sectional diameter is smaller than 30 micrometer and their magnetic saturation field $H_s$ is greater than 100 A/m (preferably greater than 200 A/m and most preferably greater than 300 A/m).

The apparatus comprises:
 (a) means for emitting a source signal of one or more base frequencies to the substrate;
 (b) a detector for detecting a detection signal emanating from the substrate; and
 (c) a signal processor for examining the detection signal for the presence of any particular higher harmonics of the base frequencies or of any linear combination of the base frequencies, where the particular higher harmonics are indicative of the presence of the magnetic elongated particles.

According to a particular embodiment of the apparatus, both the source signal and detection signal are electrical signals and the apparatus further comprises a drive coil for converting the source signal into a magnetic drive field, and a detection coil for converting a detection magnetic field into the detection signal. The coils are so arranged to null out the magnetic drive field in the detection coil in order to avoid saturating the amplifier and to minimise any cross-coupling which can occur with conducting materials.

According to a preferable embodiment of the apparatus the drive coil is arranged around a ferrite core.

The ferrite core has a U-shape and a drive coil is arranged around each leg of the U-shaped ferrite core. A detection coil is also arranged around each leg of the U-shaped ferrite core. Each detection coil is preferably divided into two parts, with one part at both sides of the drive coil. These two parts of a detection coil are wired in anti-phase in order to null out the drive signal.

Next to a drive coil and a detection coil, a third coil may be present around the ferrite core in order to detect the presence of any ferrous metals.

The apparatus according to the second aspect of the present invention can be used in automatic vending machines, bank note counting machines and reproduction apparatus.

With respect to the use in reproduction apparatus, in order to detect the presence of any security documents in the whole scanning region, the following embodiments can be used:
1) the use of more than one drive coil and more than one detection coil;
2) drive coils and detection coils forming a daisy chain of alternative drive and detection coils so arranged as to minimise the mutual inductance between adjacent coils;
3) the use of only one drive coil and one detection coil, both having an elongated form; and
4) the use of one drive coil and more than one detection coil.

According to the third aspect of the present invention, there is provided an elongated magnetic particle for being incorporated in a base material of a substrate where the base material has magnetic properties differing substantially from the corresponding magnetic properties of the particle. Preferably the base material is made of a non-magnetic material. The particle has such a long and thin form that its demagnetisation factor N is smaller than $1/250$, preferably smaller than $1/1000$. The diameter of the particle (i.e. its maximum cross-sectional dimension) is smaller than 30 micrometer, preferably smaller than 15 micrometer, preferably ranging from 1 to 10 micrometer and its magnetic saturation field $H_s$ is greater than 100 A/m, preferably greater than 200 A/m, and most preferably greater than 300 A/m.

The magnetic field strength inside the material is given by $$H_{in} = H_{app} - N \times M$$

where M is the magnetisation of the material, $H_{app}$ is the applied magnetic field and N is the demagnetisation factor.

With uniform magnetisation this reduction in the internal field strength can be considered as a reduction in the apparent permeability from its true value of $\mu_r$, which is the so-called bulk magnetic permeability or magnetic permeability of the material, to the magnetic apparent or effective permeability $\mu_r'$, where $$1/\mu_r = 1/\mu_r' - N_1 \text{ or}$$

$$\mu_r' = \mu_r/(1 + N\mu_r)$$

The effect of the reduction in permeability therefore causes the B-H loop to shear into a shape which has a higher saturation field and lower remanence. In case of a sphere, the demagnetisation factor $N = 1/3$. Whereas for long, thin ellipsoids (approximating to cylinders represented by the elongated particles such as fibers) N is given by:

$$N = [\ln(2p) - 1]/p^2 \text{ where p is the length to diameter ratio.}$$

For a fiber of 8 micrometer diameter and 3 mm length, N is equal to $1/25000$.

Based on these equations if, as an example, we take a material with a bulk permeability $\mu_r$ of 100000 then a sphere of identical material would appear to have a magnetic apparent permeability $\mu_r'$ approximatly 7000 times smaller than a fiber with the dimensions shown above. This will then have a direct effect on the magnitude of the field required to saturate the material in each case. Thus spheres, or powders of approximately spherical form would not be suitable for the application described herein.

Preferably, the magnetic saturation flux density $B_s$ of the magnetic elongated particle is greater than 0.1 Tesla and typically ranges from 0.1 Tesla to 1.0 TesLa, for example from 0.1 Tesla to 0.6 Tesla.

The apparent or effective magnetic permeability $\mu_r'$ is measured at d.c, The magnetic dynamic permeability $\mu d$. parameter is an indicator of the sensitivity of the particle in practical situations taking account of bulk permeabilities, shape factors, the a.c. frequency of the drive fields and the field limits which are typical in EAS gates and which would be practical in our proposed new invention system. The magnetic dynamic permeability $\mu_d$ is therefore herein defined as the ratio of the saturation flux density $B_s$ to the magnetic saturation field $H_s$ multiplied by $\mu_o$, measured at an a.c. frequency. If the materials do not saturate at the fields used in the magnetometer, used for the experimental measurements described in this invention, then the magnetic dynamic permeability $\mu_d$ is defined as the ratio of the flux density B to $\mu_o H$ at the maximum field used in the experiment (e.g. about 1000 A/m). The magnetic dynamic permeability $\mu_d$ is clearly related to the apparent magnetic permeability $\mu_r'$ and both parameters would have the same or close to the same value at d.c. in a low loss material in which sheer due to demagnetisation dominates the shape of the measured B-H-loop. The magnetic dynamic permeability $\mu_d$ of the magnetic elongated particle preferably ranges from 10 to 10000, e.g. from 100 to 10000.

The terms "magnetic elongated particle" refer to an elongated particle itself made of a magnetic material and possibly of a magnetic material and a non-magnetic material. In particular the magnetic material can be coated or encapsulated with a non-magnetic material or the elongated particle can be made of a non-magnetic material being coated with a magnetic material or incorporating a magnetic material. The thickness of the coating may range from 1 to 5 micrometer.

The magnetic material can be made starting from an alloy comprising components chosen among Fe, Cr, Co, Cu, Ni, Mo, Mn, Nb, B, V, C, Si and P, more particularly among Ni, Fe, Mo, Mn, Cu. Soft magnetic materials have been disclosed for example in EP-A-0 295 028 and in U.S. Pat. No. 4,298,862.

A suitable alloy composition corresponds to the general formula $Ni_aFe_bCr_cCo_dCu_eMo_fMn_gP_hNb_iB_jV_kSi_lC_m$, where a to m represent integers.

More particular alloy compositions have 52 to 85 % of nickel (Ni) and varying amounts of other components.
An example of a good working alloy composition is:
80.00% Ni, 4.20% Mo, 0.50% Mn, 0.35% Si; 0.02% C, the balance being Fe.
Other typical compositions are:
$Ni_{82}Fe_{14}Mo_3Mn_1$
$Ni_{79}Fe_{16}Mo_4Mn_1$
$Ni_{70}Fe_{11}Cu_{12}Mo_2Mn_5$
$Ni_{71}Fe_{11}Cu_{13}Mo_2Mn_3$
$Ni_{71}Fe_{11}Cu_{12}Mo_2Mn_4$.

Some of these compositions are commercialised under names as N-μ-METAL PERMAFI, PERMALLOY, SUPERMALLOY, VITROVAC, AND METGLAS-N-.

As non-magnetic and non-metallic material glass, carbon or synthetic material such as polymers especially polypropylene and polyethylene can be mentioned.

According to a preferable embodiment of this third aspect of the present invention, the elongated particle is a fiber which can be a metallic fiber or a non-metallic fiber coated with a magnetic substance.

The fibers can be uniformly dispersed and distributed all over the substrate and therefore not easily missed by the detection system. The fibers can be preferably uniformly and individually dispersed all over the substrate in order to prevent the formation of agglomerates of fibers. Additionally, since the fibers are dispersed inside the substrate, they are not easily removable by the counterfeiters who would like to remove them before making a photocopy and reinstate them inside the substrate after photocopy thereof.

The fibers are preferably hard drawn or work hardened metal fibers, e.g. manufactured according to the technique of bundled-drawing which is well known as such. This manufacturing technique has the advantage of yielding a much higher production rate than hot melt production techniques. Hard drawing makes the magnetic fibers also 'harder' from a magnetic point of view, i.e. less soft-magnetic so that a higher magnetic saturation field $H_s$ is required. This is particularly useful in the present invention since it helps to distinguish from EAS tags and prevents from setting the alarms in EAS gates. The inventors have also found that the magnetic dynamic permeability $\mu_d$ of the hard drawn fibers can be doubled by annealing. This still keeps the saturation field $H_s$ sufficiently high, but makes the fibers more sensitive.

The magnetic elongated particles may also be amorphous metal fibers.

According to a fourth aspect of the present invention, there is provided a substrate comprising a base material and elongated particles inside the base material. The magnetic properties of the elongated particles differ from the corresponding magnetic properties of the base material. Preferably the base material is made of a non-magnetic material. The elongated particles have such a long and thin form that their demaagnetisation factor N is smaller than 1/250. Their diameter is smaller than 30 micrometer and their magnetic saturation field ranges from 100 to 1000 A/m, preferably from 200 to 1000 A/m and most preferably from 300 to 1000 A/m. Preferably the base material is a non-magnetic material such as plastic or a fibrous structure like paper.

Preferably the elongated particles have a magnetic saturation flux density being greater than 0.1, and typically ranging between 0.1 Tesla and 1.0 Tesla, for example between 0.1 Tesla to 0.6 Tesla and a magnetic dynamic permeability $\mu_d$ ranging from 10 to 10000, for example between 100 and 10000.

Summarizing, the combination of shape, composition and structure of the magnetic elongated particles is such that the magnetic field required to achieve saturation of the flux density in the particle is sufficiently greater than that produced in EAS systems and sufficiently lower than that required to saturate hard ferromagnetic material such as iron, steel or plate, and
the magnetic remanent flux density is sufficiently lower than those of magnetic ink used in the magnetic coding system as defined in the international standard for magnetic ink character recognition ISO 1004 such that there is no interference with readers of magnetic characters.

These properties are fulfilled when the combination of shape, composition or structure of the magnetic elongated particles is such that the elongated particles have:
i) a saturation field ranging from 100 to 1000 A/m;
ii) a saturation flux density being greater than 0.1 Tesla, and typically ranging between 0.1 Tesla and 1.0 Tesla;
iii) a magnetic dynamic permeability $\mu_d$ ranging from 10 to 10000, for example ranging from 100 to 10000.

The magnetic elongated particles, especially the fibers, have a mean cross-sectional diameter ranging from 1 to 30 micrometer (μm), preferably from 5 to 15 micrometer, and a length ranging from 1 to 20 mm, preferably ranging from 2 to 10 mm.

Most preferably the elongated particles are hard drawn or work hardened metal fibers, but can also be amorphous metal fibers.

The magnetic elongated particles can be made of an alloy comprising components chosen among Ni, Fe, Cr, Co, Cu, Mo, Mn, P, Nb, B, V, C, Si, and more particularly Fe, Ni, Mo, Mn, Si and C.

The base material of the substrate can be made of paper or of a synthetic material, especially a plastic such as polypropylene or polyethylene.

The magnetic elongated particles can also be made of magnetic and non-magnetic material.

Preferably the substrate according to the fourth aspect of the present invention, has a quantity of magnetic elongated particles, especially fibers, ranging from 0.1 to 5 per cent, preferably from 0.2 to 2 per cent, most preferably from 0.5 to 1.5 per cent by weight relative to the weight of the substrate. If the substrate is a paper sheet, its thickness commonly varies from 20 to 300 micrometer. Bank notes usually have a thickness varying between 80 and 120 micrometer.

The elongated particles may be uniformly or randomly dispersed in the whole substrate and/or may be present only in selected parts of the substrate. The fibers may be distributed within a substrate in selected parts thereof according to methods known in the art and especially in methods disclosed in WO 96/14469 (PCT/FR95/01405). Preferably the fibers are included only in parts of bank notes corresponding to printed areas so that the fibers are less visible. More particularly, the fibers are included outside any watermark area. Most preferably, the fibers are outside the areas which are printed with magnetic ink so as to avoid any possible electromagnetic interference.

In one preferred embodiment the fibers are present within the substrate in areas having the form of tapes of a width of at least 20 mm.

Preferably, the elongated particles, especially the fibers have a colour near to the colour of the base material. This can be realised by the deposit of a covering or a coating providing to the fibers the wished colour. Methods of depositing such a coating have been disclosed in French patent application FR 95 02868 and in international application PCT/FR/96 00390.

BRIEF DESCRIPTION OF THE DRAWINGS

The present invention will now be illustrated in more detail with reference to the accompanying drawings wherein FIG. 1 compares the B-H curve of a magnetic elongated particle according to the invention with B-H curves of other objects.

DETAILED DESCRIPTION OF THE INVENTION

Figure 1:
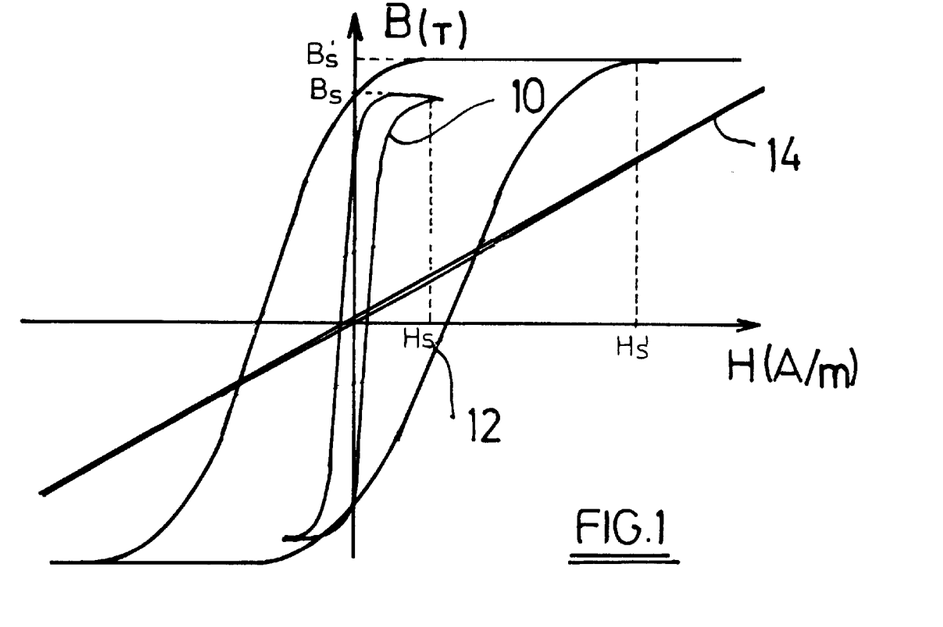

Reference number 10 in FIG. 1 refers to a B-H curve of an EAS label which can be designated as "very soft magnetic". It is characterised by a very low saturation field $H_s$ and a rather high level of magnetic dynamic permeability. Reference number 12 refers to a B-H curve of a magnetic elongated particle which is to be embedded in a substrate according to the present invention. Although being also a soft magnetic material, it is not that "very soft" as is an EAS label. The saturation field $H'_s$, is higher than the corresponding values of an EAS label. Reference number 14 refers to the B-H curve of a mild steel plate clearly showing a saturation field that is much larger than $H_s$ and $H'_s$.

It will be clear from FIG. 1 that the low magnetic fields applied in EAS systems to saturate the EAS labels do not saturate the magnetic elongated particles according to the present invention and do not trigger the alarm systems in shops. It will also be clear from FIG. 1 that magnetic fields applied in the present invention to saturate the magnetic elongated particles are still in the relatively linear part of a B-H curve of a mild steel plate and will not create the same series of higher harmonics. This difference can be used in order to discriminate between the two types of materials and even to detect the marker tag in the presence of large ferromagnetic objects.

The following table shows an experimental comparison of actual markers and examples of common magnetic objects measured in a magnetometer at between 200 Hz to 11 kHz.

TABLE

| Type of material + geometric dimensions | saturation flux density $B_s$ (Tesla) | saturation field $H_s$ (A/m) | dynamic permeability $\mu_d$ [$B_s/(\mu_o H_s)$] |
|---|---|---|---|
| EAS label 32 mm × 0.8 mm × 25 µm | 0.34 | 30 (200 Hz) 80 (11 kHz) | 10000 |
| paper clip | | >1000 (200 Hz) | 90 |
| mild steel plate 12 mm × 9 mm × 1 mm | | >>1000 | 14 |
| hard drawn magnetic metal fibre 3 mm length × 8 µm diameter | 0.55 | 500–6000 (11 kHz) | 730 |

$\mu_o = 4\pi \times 10^{-7}$ Vs/Am

The EAS label in the table has a volume and mass which is about 3000 times that of the metal fiber of the table.

The above figures represent the relative differences between the materials. It should be appreciated, however, that in practical cases for EAS tags and the invention system, the actual magnetisation of the scanning or interrogating field needs to be taken into account at the orientation of the material in the field, the bulk of material present and the frequencies used.

The magnetic metal fiber had an a.c. remanence of 0.3 Tesla in the measurement. In practice the d.c. remanence would be lower than this so that no significant electromagnetic noise signals are generated which interfere with other magnetic code systems. In particular, the fibers did not interfere with a standard magnetic character reader reading characters made for magnetic inks. In other words, using the measurement method and definition of maximum residual signal levels as defined in the International Standard for magnetic ink character recognition, ISO 1004, the effect of remanent flux density is acceptable.

Experimental results show that it is possible to detect a good signal amplitude at high harmonics from the fiber mentioned in the above table and that at high frequencies there is very low interference from harmonics from the drive electronics. With the small cross sectional area of the fibers the eddy current losses are small up to quite high frequencies and the output signals are increased by the fact that the detected voltage is proportional to the rate of change of flux density. With bulk ferromagnetic materials the eddy current losses are much higher at high frequencies and so they don't generate very high harmonics. Using a base frequency to sweep the fibers (which are characterised in the table above) around their B-H loop at 20 kHz, and a peak field greater than 600 A/m it was found that at frequencies between 100 kHz and 1 MHz there was a stream of harmonics from the fibers and very much smaller signals from other common electrically conducting objects. In practice the base frequency and the detection frequency or frequencies can be selected to maximise the signal from the particular fiber marker and minimise signals from other common objects and signals generated from the apparatus in which the system is installed.

Tests carried out by the inventors have indicated that the invention system provides a good discrimination between a security document with magnetic elongated particles and paper, books, hands, printed circuit boards, metallic foil greeting cards, non metallic bindings of documents, spiral metal bindings of documents, paper clips, metal plates and photocopier lid materials. A security document lying under a non-magnetic metal plate could be easily identified (this in great contrast with a microwave system where the metal plate conceals the magnetic fibers for the microwaves)

Figure 2:
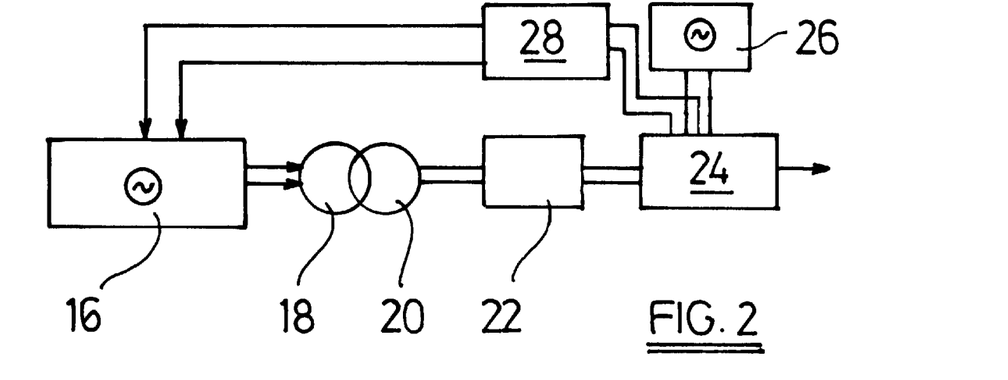
FIG. 2 schematically illustrates a configuration of a detection apparatus according to the present invention.

A suitable drive and detection circuit is shown in FIG. 2. A resonant drive power oscillator 16 is used to minimise harmonic generation and the oscillator 16 is driven by a frequency which is divided down from the selected harmonic. As an example, the inventors have found that, amongst other harmonics, the 19th harmonic of 20 kHz, at 380 kHz, or the 21st harmonic or a higher harmonic may be a good choice as it gives good signals from fibers with very small signals from common ferromagnetic materials such as mild steel. The oscillator 16 generates an electrical source signal which is fed to a drive coil 18 which transforms the electrical source signal into a magnetic drive signal. A detection coil 20 suitably arranged with respect to the drive coil 18, detects any field emanating from magnetic elongated particles and transforms this into an electrical detection signal. A high pass filter 22 is used to reduce the fundamental frequency, as this can be coupled between the coils by conducting metals and overload the amplifiers. A phase sensitive detector 24 is used to provide good signal-to-noise ratio. Oscillator 26 operates at the frequency of the selected harmonic, and frequency divider 28 divides the frequency in order to obtain the base frequency. Other high harmonics are also suitable and it is an advantage to combine several to derive the final detection signal.

Figure 3:
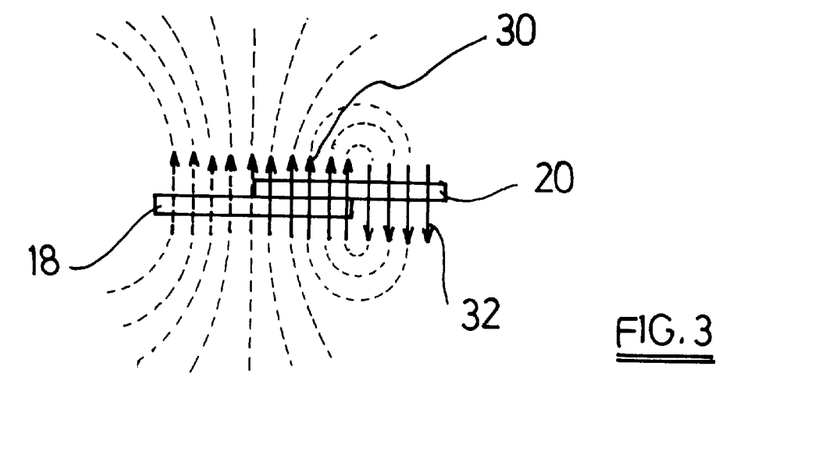
FIG. 3 shows how a drive coil and a detection coil of an invention apparatus can be arranged FIG. 4, FIG. 5, FIG. 6 and FIG. 7 all illustrate embodiments of drive coil(s) and detection coil(s) for use in a reproduction apparatus

FIG. 3 illustrates how the drive coil 18 may be advantageously arranged with respect to the detection coil 20. The direction of the magnetic field generated by the drive coil is shown in hatched lines, except for that part of the magnetic field that goes through the detection coil 20, which is shown by means of arrows 30 and 32. Drive coil 18 and detection coil 20 partially overlap and are so arranged that the part of the magnetic flux which goes in one direction (arrow 30) through detection coil 20 is almost equal to the part of the flux which goes in the other direction (arrow 32) in order to null-out the drive field in the detection coil whilst providing a region above the overlapping coils in which the magnetic field is effective in coupling into the magnetic elongated particles. An equivalent nulling effect could also be provided electronically by a negative feedback of the fundamental frequency.

FIG. 4, FIG. 5, FIG. 6 and FIG. 7 all show embodiments of arrangement of drive coil and detection coil to be used in reproduction apparatus such as high-resolution colour photocopying apparatus. The arrangement is such that a bank note with a width of only 7 cm can be detected on a scanning area of 21 cm×29.7 cm (if it contains magnetic elongated particles). Other arrangements are possible to cover larger areas such as areas corresponding to a DIN A3 (about 30 cm×42 cm) size or greater.

Figure 4:
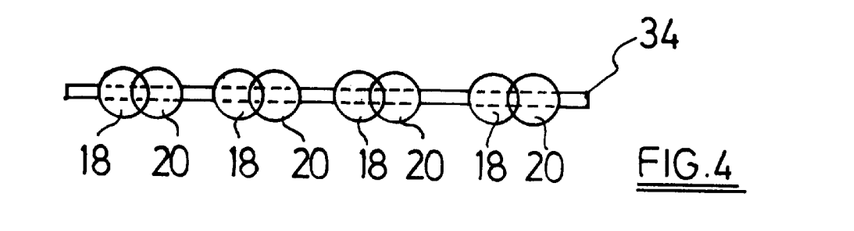

According to FIG. 4, four pairs of a drive coil 18 with a detection coil 20 are arranged on a suitable carrier 34 at regular distances along the width of the scanning area so that the presence of any genuine bank note will be detected irrespective of its position on the scanning area.

Figures 5, 6:
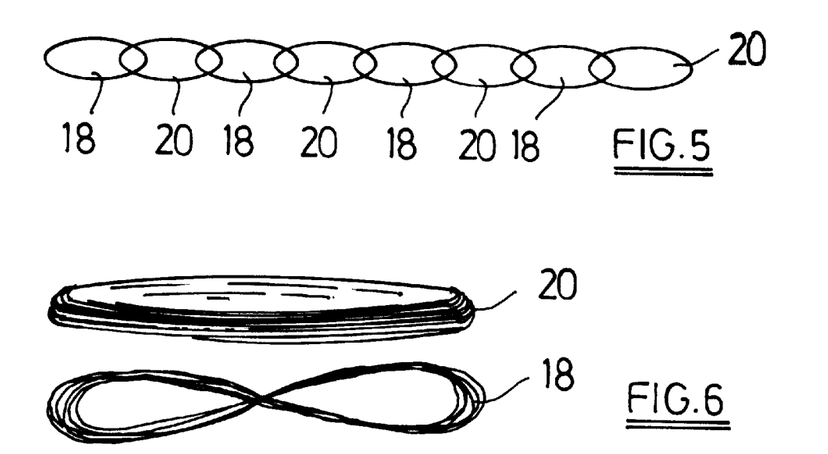

In the embodiment of FIG. 5 a plurality of drive coils 18 and a plurality of detection coils 20 form a daisy chain wherein a drive coil 18 is alternated with a detection coil 20 and vice versa.

In the embodiment of FIG. 6 the drive coil 18 takes the form of an elongated eight with the height of the eight equal to the width of the scanning area. The detection coil takes the form of an elongated ellipse with the length of the longitudinal axis equal to the width of the scanning area. Drive coil 18 and detection coil 20 are arranged one above the other so that here also the part of the magnetic flux which goes in one direction through detection coil 20 is almost equal to the part of the flux which goes in the other direction in order to null-out the drive field in the detection coil. FIG. 6 shows for didactical reasons a drive coil 18 and a detection coil 20 at a distance apart from each other, but they are to be arranged next to one another.

Figure 7:
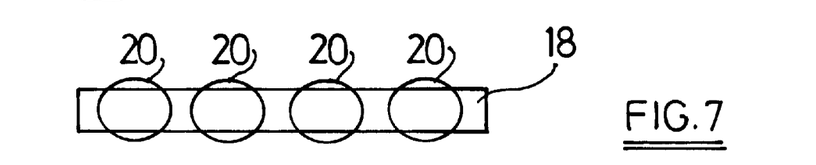

FIG. 7 shows schematically an embodiment with only one drive coil 18 and four detection coils 20 so arranged that the drive magnetic flux balances out in detection coils 20.

Description of a Preferable Embodiment.

Figure 8:
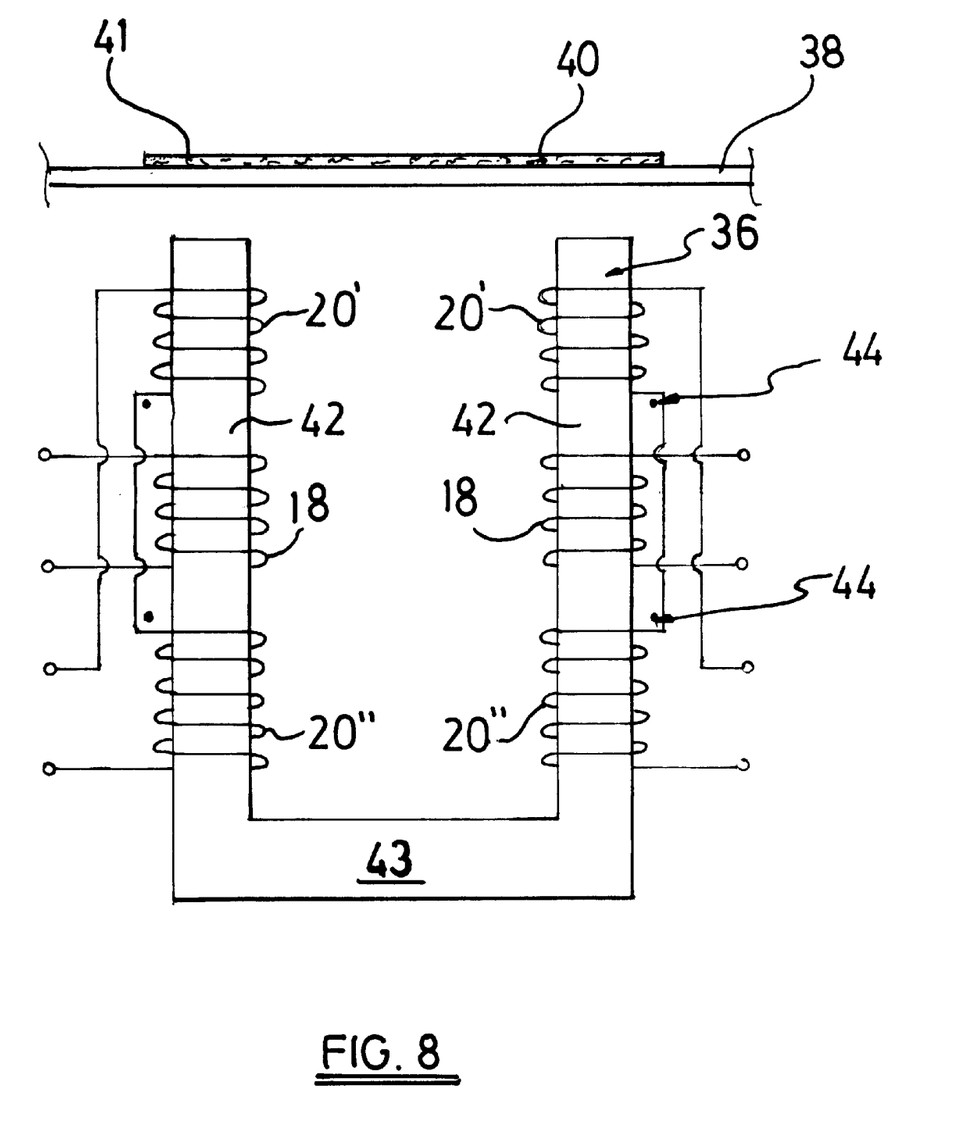
FIG. 8 illustrates a preferable embodiment of drive and detection coils arranged around a ferrite core.

Referring to FIG. 8, drive coils 18 and detector coils 20' and 20" are arranged around a ferrite core 36. For use in a reproduction apparatus, the ferrite core 36 is positioned at a few mm from a glass platen 38. A security document 40 comprising elongated magnetic particles 41 is positioned on the glass platen. The ferrite core 36 is used to ensure a higher magnetic field at the level of the security document 40 for a given drive current.

The ferrite core 36 must not saturate in order to avoid from creating additional non-linearities and harmonics.

The ferrite core 36 is preferably U-shaped. This means it has two legs 42 connected by a "bridge" 43. The bridge 43 ensures that the flux flow is kept away from any neighbouring metal of the reproduction apparatus.

A drive coil 18 is wired somewhere in the middle of each leg 42. The detector coil is divided into two parts 20' and 20". One part 20' is wired at the side of the glass platen 38 around the leg 42, the other part 20" is wired at the down side around the leg 42. Both parts 20' and 20" may advantageously wired in anti-phase, as designated by reference number 44, in order to null out the received drive signal and other sources of interference such as the presence of a lamp in the reproduction apparatus. The wiring in anti-phase, however, does not null out the signals received from any alongated magnetic particles 41 since one part 20', the top coil part, of the detection coil is positioned much nearer to the magnetic particles than the other part 20", the bottom coil part.

Next to the drive coil and the detection coil, a third coil may be wired around the ferrite core in order to detect the presence of any ferrous metal on the glass platen 38. As is known in the art, the presence of any ferrous metal may disturb the magnetic flux pattern so that a ferrous metal could be used to hide the presence of any security documents with elongated magnetic particles. For reason of simplification this third coil is not shown in FIG. 8. The signal in the third coil is amplified and rectified and compared with a threshold level. This threshold level is proportional to the drive current in order to avoid that changes in the drive current e.g. due to inductance changes affect the sensitivity. The presence of ferrous metal increases the amplified and rectified signal, presence of non-ferrous metal decreases the amplified and rectified signal.

For use in a reproduction apparatus such as a colour copying machine, six or more embodiments as shown in FIG. 8 are used and connected with each other in order to cover the whole scanning area of the reproduction apparatus.

What is claimed is:

1. A detection apparatus for detecting the presence of magnetic elongated particles in a substrate, the base material of the substrate having magnetic properties substantially differing from the corresponding magnetic properties of the elongated particles, the elongated particles having such a long and thin form that their demagnetization factor N is smaller than $1/250$, having a diameter smaller than 30 micrometer and having a magnetic saturation field greater than 100 A/m, said apparatus comprising:

a) means for emitting a source signal of one or more base frequencies to said substrate;

b) means for detecting a detection signal emanating from said substrate; and c) a signal processor for examining the detection signal for the presence of any particular higher harmonics of said base frequencies or of any linear combination of said base frequencies or of said harmonics, said particular higher harmonics being indicative of the presence of said magnetic elongated particles.

2. An apparatus according to claim 1 wherein both said source signal and detection signal are electrical signals and wherein said apparatus further comprises a drive coil for converting the source signal into a magnetic drive field, and a detection coil for converting a detection magnetic field into the detection signal, both coils being so arranged to null out the magnetic drive field in the detection coil.

3. An apparatus according to claim 2 wherein the drive coil and the detection coil partially overlap.

4. An apparatus according to claim 2 wherein the drive coil is arranged around a ferrite core.

5. An apparatus according to claim 4 wherein said ferrite core has a U-shape.

6. An apparatus according to claim 5 wherein a drive coil is arranged around each leg of the U-shaped ferrite core.

7. An apparatus according to claim 6 wherein a detection coil is also arranged around each leg of the U-shaped ferrite core.

8. An apparatus according to claim 7 wherein each detection coil is divided into two parts, one part at both sides of said drive coil.

9. An apparatus according to claim 8 wherein said two parts are wired in anti-phase.

10. An apparatus according to claim 2 wherein said apparatus comprises next to the drive coil and the detection coil, a third coil for detecting the presence of any ferrous metal.

11. A reproduction apparatus comprising a detection apparatus according to claim 1 in order to discover the presence of any security documents in a scanning region of the reproduction apparatus.

12. A reproduction apparatus according to claim 11 wherein said detection apparatus comprises one or more drive coil and more than one detection coil in order to cover the whole length of the scanning region.

13. A reproduction apparatus according to claim 12 wherein said drive coils and said detection coils form a daisy chain of alternative drive and detection coils so arranged as to minimise the mutual inductance between adjacent coils.

14. A reproduction apparatus according to claim 12 wherein said drive coil has the form of a long ellipse having a longitudinal axis which is substantially equal to the length of the scanning region.

15. An automatic vending machine comprising an apparatus according to claim 1.

16. A bank note counting machine comprising an apparatus according to claim 1.

17. A detection apparatus for detecting the presence of magnetic particles in a substrate, the base material of the substrate having magnetic properties differing substantially from the magnetic properties of the magnetic particles, the magnetic particles having such a configuration that their demagnetization factor N is smaller than $1/250$, their diameter being smaller than about 30 micrometer and their magnetic saturation field being greater than 100 A/m, said apparatus comprising:

a) an emitter being provided, the emitter emits a source signal of one or more base frequencies to the substrate;

b) a detector being provided, the detector detects a detection signal emanating from the substrate; and c) a signal processor being provided, the signal processor examines the detection signal for the presence of any particular higher harmonics of the base frequencies or for the presence of any linear combination of the base frequencies or of the harmonics, the particular higher harmonics being indicative of the presence of the magnetic particles.

18. An apparatus according to claim 17, wherein:

a) both the source signal and the detection signal are electrical signals;

b) a drive coil is provided, the drive coil converts the source signal into a magnetic drive field;

c) a detection coil is provided, the detection coil converts a detection magnetic field into the detection signal; and d) both coils are arranged so as to null out the magnetic drive field in the detection coil.

19. An apparatus according to claim 18, wherein:

a) the drive coil and the detection coil partially overlap.

20. An apparatus according to claim 18, wherein:

a) the drive coil and the detection coil include a plurality of drive coils and detection coils; and b) the plurality of drive coils and detection coils form a daisy chain of alternating drive and detection coils configured so as to minimize the mutual inductance between adjacent coils.

21. An apparatus according to claim 18, wherein:

a) the detection coil is divided into two parts, one part at both sides of said drive coil.

22. An apparatus according to claim 21, wherein:

a) the two parts of the detection coil are wired in anti-phase.

23. A reproduction apparatus comprising a detection apparatus according to claim 17 in order to discover the presence of any security documents in a scanning region of the reproduction apparatus.

24. A reproduction apparatus according to claim 23, wherein:

a) said detection apparatus includes one or more drive coils and one or more detection coils in order to cover substantially the whole length of the scanning region.

25. An automatic vending machine comprising an apparatus according to claim 17.

26. A bank note counting machine comprising an apparatus according to claim 17.

27. An apparatus according to claim 17, wherein:

a) the particles detected are elongated particles.

* * * * *